United States Patent [19]
Taji et al.

[11] Patent Number: 5,239,220
[45] Date of Patent: Aug. 24, 1993

[54] STATOR WEDGE AND GUIDE JIG THEREFOR

[75] Inventors: Ryoichi Taji; Takushi Takizawa, both of Himeji, Japan

[73] Assignee: Mitsubishi Denki K.K., Tokyo, Japan

[21] Appl. No.: 934,896

[22] Filed: Aug. 26, 1992

Related U.S. Application Data

[63] Continuation of Ser. No. 690,250, Apr. 24, 1991, abandoned.

[30] Foreign Application Priority Data

Apr. 26, 1990 [JP] Japan .................. 2-108639

[51] Int. Cl.⁵ ............... H02K 15/08; H02K 3/487
[52] U.S. Cl. .................... 310/214; 310/42; 29/732
[58] Field of Search ........... 310/214, 215, 218, 259, 310/42; 29/732

[56] References Cited

U.S. PATENT DOCUMENTS

| | | | |
|---|---|---|---|
| 2,201,699 | 5/1940 | Myers | 310/214 |
| 2,232,773 | 2/1941 | Daiger | 310/214 |
| 2,484,007 | 10/1949 | Atwell | 310/214 |
| 2,569,278 | 9/1951 | Barth | 310/64 |
| 2,922,058 | 1/1960 | Bacon | 310/214 |
| 3,447,009 | 5/1969 | Keuth et al. | 310/214 |
| 3,818,571 | 6/1974 | Arnold et al. | 29/205 R |
| 4,313,068 | 1/1982 | Avrukh et al. | 310/58 |
| 4,572,980 | 2/1986 | Anderson et al. | 310/214 |
| 4,857,787 | 8/1989 | Taji et al. | 310/180 |
| 5,030,871 | 7/1991 | Shah et al. | 310/261 |

FOREIGN PATENT DOCUMENTS

| | | | |
|---|---|---|---|
| 8401476 | 4/1984 | Int'l Pat. Institute . | |
| 0046643 | 3/1982 | Japan | 310/214 |
| 0080128 | 5/1984 | Japan | 310/214 |
| 2096497 | 10/1982 | United Kingdom . | |

*Primary Examiner*—Steven L. Stephan
*Assistant Examiner*—D. R. Haszko
*Attorney, Agent, or Firm*—Sughrue, Mion, Zinn, Macpeak & Seas

[57] ABSTRACT

A stator wedge having a cross section of a dove-tail is disposed at a radially inner side of each of a plurality of slots formed in a ring-shaped core and having a coil inserted therein. Also disclosed is a guide jig for guiding the wedge having the dove-tail cross section into the slots. The guide jig has formed in both side surfaces an edge portion engageable with the wedge.

1 Claim, 5 Drawing Sheets

STATOR WEDGE AND GUIDE JIG THEREFOR

This is a continuation of application Ser. No. 07/690,250 filed Apr. 24, 1991 now abandoned.

BACKGROUND OF THE INVENTION

This invention relates to a wedge of a stator for a vehicular a.c. generator for example and a guide jig for guiding the wedge into the radially inner side of the slots.

FIG. 5 is a sectional view of the main portion of a conventional stator of a vehicular ac generator, in which 1 is a stator core, 2 are a plurality of slots formed in the inner circumference of the core 1 at equal intervals, 3 are teeth formed between the slots 2, 4 is a U-shaped wedge attached to each slot 2 and 5 are guide jigs used for inserting the coil and wedge 4 within the slots 2.

FIG. 6 is a perspective view of the guide jig 5, in which 6 is an inner-diameter receiving portion formed in the tip portion of the guide jig 5 for abutting against the radially inner portion of the core 1, 7 is an end face receiving portion for abutting to an end surface of the core 1, 8 is a wedge guide formed on one side of the guide jig 5 and having a T-shaped cross-section, and 9 is a groove formed on both sides of the wedge guide 8.

FIG. 7 is a sectional view illustrating the state after a coil 10 is inserted into the slots 2 through the use of the guide jig 5, wherein the coil 10 is inserted into the slots 2 by first winding a conductor into a ring having the necessary number of turns, and when mounting a coil unit, which was formed into a configuration having radial projections and grooves of numbers corresponding to the pole number, into the guide jig 5. The U-shaped wedges 4 are also inserted into the grooves 9. In this state, by pressing the inside of the coil unit with a coil presser 11 and the wedges 4 with a wedge presser 12, the coil 10 and the wedges 4 are concurrently inserted into the slots 2.

The wedge 4 of the conventional stator constructed as above described is disposed within the slot 2 in the shaped of a "U", so that the space factor of the coil 10 relative to the slots 2 is disadvantageously low.

Also, the conventional guide jig is arranged to guide the wedge 4 with its entirety wrapped by the wedge guide 8 and the wedge guide 8 projects to the slots 2 and the teeth 3 as illustrated in FIG. 5, so that the rear coil end portions 13 are caught and clamped within a gap between a core back 14 and the wedge guide 8, causing the insulating coating on the coil 10 and the core 1 to be damaged.

SUMMARY OF THE INVENTION

The the first invention of this application has been made to solve the above problems and has as its object the provision of a stator wedge which improves the space factor of the coil relative to the slots.

The second invention of this application has as its object the provision of a guide jig which can smoothly insert the coil into the slots.

The stator wedge of the first invention has a dove-tail cross section and disposed at a radially inner side of each of a plurality of slots formed in a ring-shaped core and having a coil inserted therein.

The guide jig of the second invention has an edge portion engageable by a wedge formed on both side surfaces of the jig.

According to the first invention of the present application, the wedge of the dove-tail cross section is disposed at a radially inner side of each slot, the space factor of the coil relative to the slots is improved.

According to the second invention of the present application, the edge portion engageable by the wedge is formed on both side surfaces, the guide jig cannot be an obstacle for the insertion of the coil into the slots.

BRIEF DESCRIPTION OF THE DRAWINGS

The present invention will become more readily apparent from the following detailed description of the preferred embodiment of the present invention taken in conjunction with the accompanying drawings, in which.

DESCRIPTION OF THE PREFERRED EMBODIMENTS

Figure 1A:
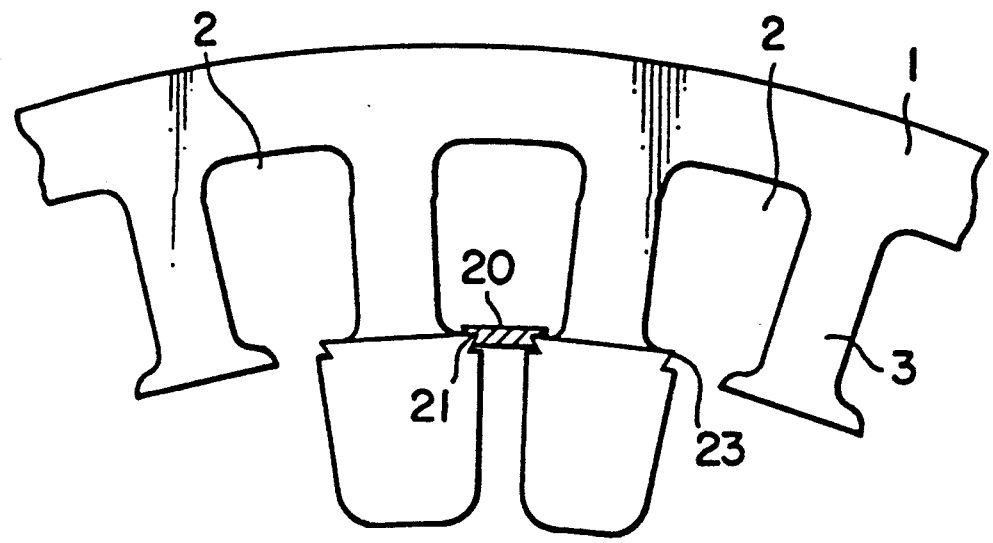
FIGS. 1(a) and b are a sectional view and a schematical view of the main portion of one embodiment of the first invention of the present invention, respectively.
Figure 6:
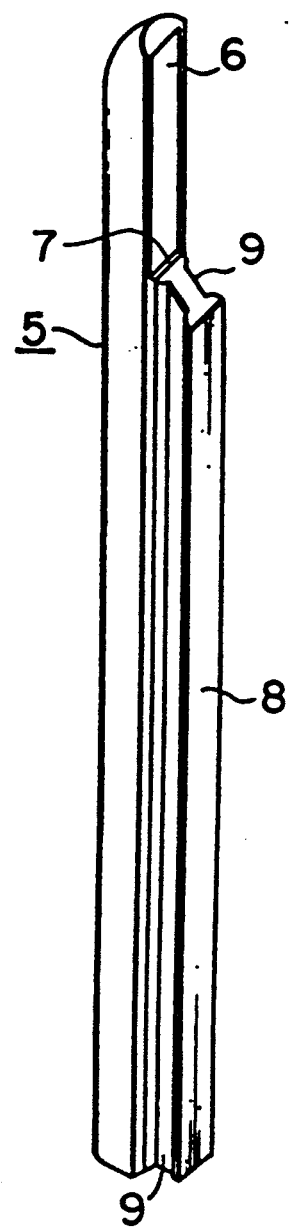
FIG. 6 is an overall perspective view illustrating one example of a conventional guide jig.
Figure 5:
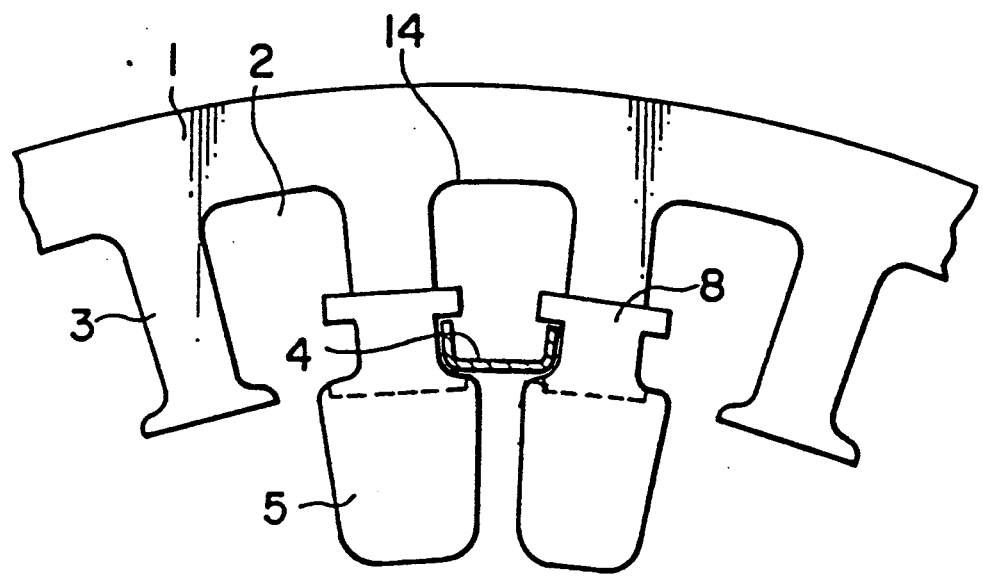
FIG. 5 is a sectional view of the main portion illustrating one example of a conventional stator of a vehicular ac generator.
Figure 7:
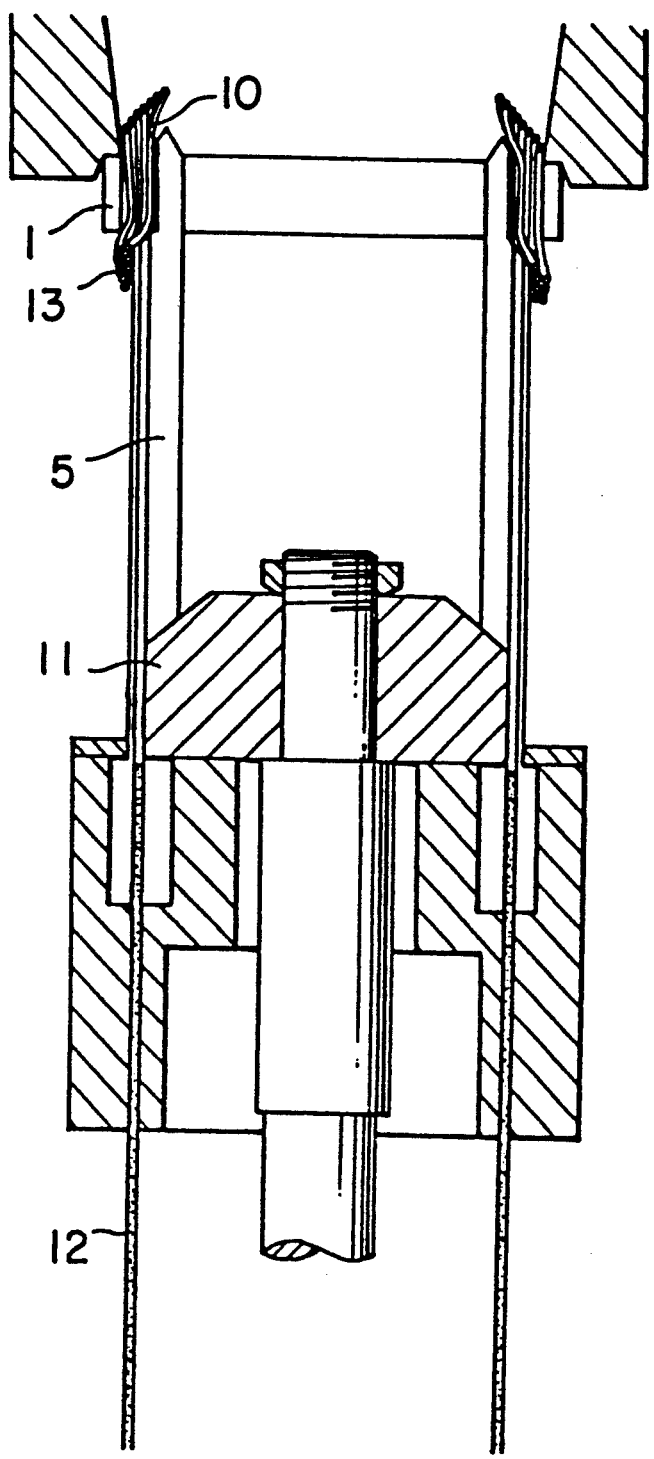
FIG. 7 is a view illustrating the state in which the coil is inserted into the slots by means of the guide jig illustrated in FIG. 6.

An embodiment of the present invention will now be described in conjunction with the drawings. FIG. 1 is a sectional view of the main portion of a stator wedge of a vehicular ac generator of one embodiment of the first invention, and the illustrated components the same as or corresponding to those illustrated in FIGS. 5 to 7 are designed by the same reference numerals and their descriptions are omitted.

Figure 2:
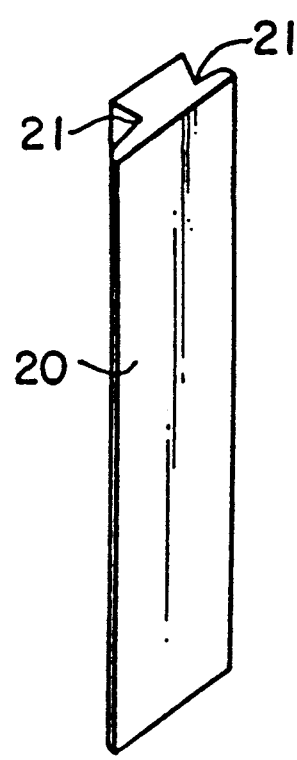
FIG. 2 is an overall perspective view of the wedge illustrated in FIG. 1.
Figure 2:
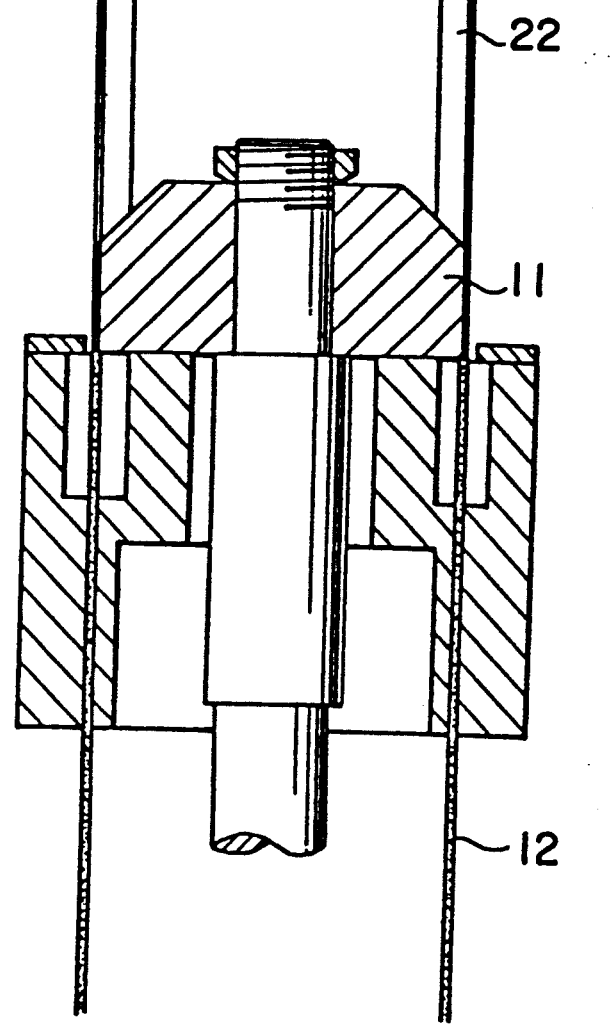

In the figure, a wedge 20 is mounted in the slot 2 which, as illustrated in FIG. 2 has a stepped recess 21 in opposite sides of the wedge 20 to have a dove-tail cross section.

Figure 3:
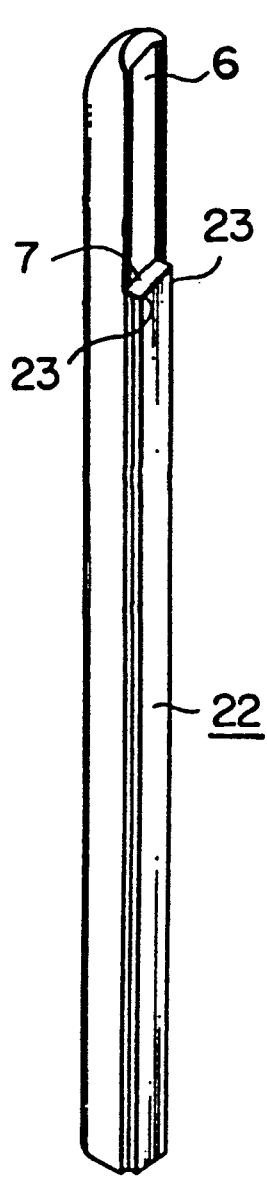
FIG. 3 is an overall perspective view illustrating one embodiment of the second invention of the present invention.

FIG. 3 is a perspective view of a guide jig 22 of another embodiment of the invention, wherein an edge portion 23 is formed at both sides of the guide jig 22 and adapted to engage with the recess 21 of the wedge 20.

Figure 1B:
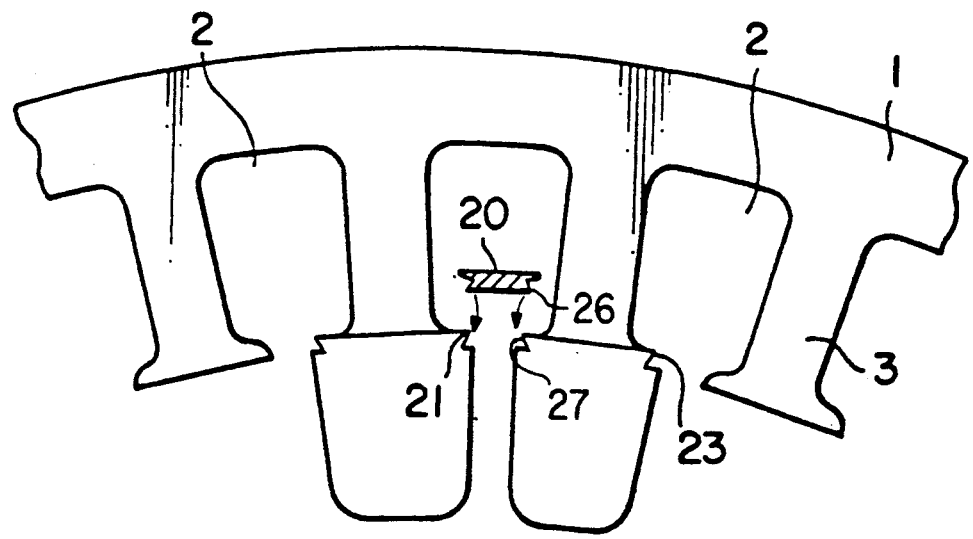
Figure 4:
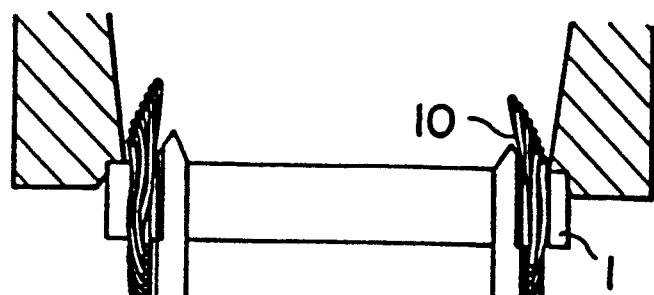
FIG. 4 is a view illustrating the state in which the coil is inserted into the slots by means of the guide jig illustrated in FIG. 3.

FIG. 4 is a sectional view illustrating the state in which the coil 10 is inserted into the slots 2 by the guide jig 22. In order to insert the coil 10 into the slot 2, a length of an electrical conductor is wound into a ring having a necessary number of turns, and the wound ring is formed into the coil unit having the radial projections and grooves of a number corresponding to the number of poles, and this unit is disposed within the guide jig 22. Also, the edge portions 23 are engaged with the recess portions 21 and correspondingly, the projecting portions 26 of the wedge are respectively received in the complementary V-shaped recesses 27 of adjacent guide jigs, is shown in FIG. 1(b), so that the dove-tailed wedge 20 is mounted to the guide jig 22. From this state, the coil 10 and the wedge 20 are concurrently inserted into the slots 2 by pushing the inner side of the coil unit by the coil pusher 11 and the wedge 20 by the wedge pusher 12.

While the above embodiment has been described in terms of the stator wedge of a vehicular ac generator, the present invention can be equally applied to a stator wedge of another ac generator for other than vehicles.

As has been described above, in the stator wedge of the first invention, the wedge of the dove-tail cross section is disposed at the radially inner side of the slot, so that the space factor of the coil relative to the slots can be advantageously improved.

Also, in the guide jig of the second invention, the jig has formed at both sides thereof edges engaged by the dove-tail wedge, so that the coil can be smoothly inserted into the slots and the insulating coatings of the coil and the core cannot be damaged.

What is claimed is:

1. A stator, comprising:
   a body having a ring-like shape with a plurality of teeth protruding inwardly therefrom and having a space separating each of said teeth, each of said teeth including a projection on opposite sides of a distal end thereof;
   a plurality of coils respectively disposed within said spaces; and
   a plurality of dove-tail shaped wedges, including v-shaped recesses on respective opposite sides thereof defining v-shape projections, respectively disposed within said spaces for retaining said coils therein, said recesses of each of said wedges respectively receiving opposing projections of adjacent teeth to retain said wedges in place, wherein a plurality of guide jigs are provided for guiding said wedges, each of said guide jigs also having a dove tail shape including a v-shaped recess on opposite sides thereof substantially complimenting said v-shaped projection of said wedge, wherein said v-shape projections of each of said wedges are respectively received in opposing v-shaped recesses of adjacent guide jigs so as to be retained thereby to enable said guide jigs to guide said wedges into engagement with said teeth.

* * * * *